United States Patent [19]

Matsuoka et al.

[11] 3,846,761

[45] Nov. 5, 1974

[54] POSITIONING CONTROLLING APPARATUS

[75] Inventors: Shigeru Matsuoka, Toyama; Shigeru Mori, Nakaniikawa-gun, both of Japan

[73] Assignee: Kabushiki Kaisha Fujikoshi, Toyama-shi, Toyama-ken, Japan

[22] Filed: June 21, 1973

[21] Appl. No.: 371,953

[30] Foreign Application Priority Data

July 13, 1972 Japan .............................. 47-70276

[52] U.S. Cl. .......................................... 340/172.5

[51] Int. Cl. ........................ G06f 15/50, G05b 19/00

[58] Field of Search ............. 340/172.5; 235/151.11

[56] References Cited

UNITED STATES PATENTS

| | | | |
|---|---|---|---|
| 3,715,644 | 2/1973 | Bobrowicz et al. | 235/151.11 |
| 3,732,544 | 5/1973 | Obland | 340/172.5 |
| 3,770,947 | 11/1973 | Derly | 235/151.11 |

*Primary Examiner*—Gareth D. Shaw
*Assistant Examiner*—Paul R. Woods
*Attorney, Agent, or Firm*—Flynn & Frishauf

[57] ABSTRACT

In apparatus for controlling the positioning of a moving machine including a plurality of drive axes, there are provided a flip-flop circuit connected to be set by a sampling signal for producing a recording signal, a magnetic memory device responsive to the recording signal for generating a timing signal, a gate circuit connected to be enabled by the recording signal and the timing signal, a timing counter controlled by the gate circuit, a data selector which selects a block commencement code and causes it to be written the magnetic memory device when the count of the timing counter assumes a predetermined value and a plurality of data registers storing data corresponding to respective axes or position information. The timing counter operates to successively select one of the data registers to write the data stored in the selected data register into the magnetic memory device each time the timing counter increases its count. There are also provided a select circuit for selecting the information word of the last axis which is used to construct a word or block of data, and a block length coincidence circuit for identifying the data and comparing the same with the count of the counter in accordance with the selected information word whereby only the information which has been stored in the selected data registers is selectively stored in the magnetic memory device.

10 Claims, 4 Drawing Figures

POSITIONING CONTROLLING APPARATUS

BACKGROUND OF THE INVENTION

This invention relates to apparatus for controlling positioning of a moving machine having a plurality of drive axes, such as an industrial robot.

In prior art apparatus for positioning a moving machine including a plurality of drive axes, when recording or reproducing information into and from a magnetic memory device at any positioned point an axis word concerning all axes is recorded or reproduced as one block (positioned point). For this reason, since the construction or assembly of the word in one block is fixed even for an axis not operating or used at a given positioned point, the number of the blocks (the number of the positioned point) has been limited by the storing capacity of the magnetic memory device.

SUMMARY OF THE INVENTION

It is an object of this invention to provide an improved apparatus for controlling the positioning of a moving machine such as an industrial robot according to which the construction or assembly of the word in one block is varied in any desired manner, thereby enabling the use of a large number of blocks or positioned points for a given capacity of the magnetic memory device.

A further object of this invention is to provide an improved apparatus for controlling the positioning of a moving machine having a plurality of drive axes, according to which when recording the information concerning the positioned point of each axis in a magnetic memory device such as a magnetic disc or a magnetic drum, the number of axis words in one block for any positioned point is varied to any desired number and the content of the memory device can be reproduced for reproducing the positioned point.

According to this invention these and further objects can be accomplished by providing apparatus for controlling the positioning of a moving machine including a plurality of drive axes, the apparatus comprising a flip-flop circuit connected to be set by a sampling signal for producing a recording signal, a magnetic memory device responsive to the recording signal for generating a timing signal, a timing counter connected to be enabled responsive to the recording signal and the timing signal, a data selector which selects a block commencement code and writes the code into the magnetic memory device when the count of the timing counter assumes a predetermined value, a plurality of data registers storing positioning data words of the machine, the data words collectively defining a block of data, the timing counter successively selecting one of the data registers via the data selector to write the data stored in the selected data register into the magnetic memory device each time the timing counter increases its count, a block length selecting circuit for selecting the information word of the last position information data which is used to construct or assemble the block of data, and a coincidence circuit for identifying the data and comparing the same with the count of the counter in accordance with the selected information word whereby only the information which has been stored in the selected data registers is selectively stored in the magnetic memory device.

According to this invention it is possible to store the process steps of a simple recurring operation such as welding or other dangerous operations in the magnetic memory device so as to perform program control of these operations. When the information stored in the memory device is reproduced, it is possible to perform such recurring operations thereby enabling a point-to-point control or a continuous path control or a combination thereof. Since it is possible to store a number of programs so as to selectively use any one of them the control apparatus of this invention is suitable for use in many types of machines including industrial robots.

The control apparatus of this invention includes a circuit construction constructed such that when sampling and recording various data of a program into a magnetic memory device, different words or blocks of data are constructed for a point-to-point control, a continuous path control and a mixed path control thereby enabling recording of the data for respective blocks. In other words, the word or data corresponding to a not used axis is eliminated so as to construct the coordinate point of each drive axis of the machine with a minimum number of words. Accordingly, it is possible to use a number of sampling points with a memory device of a limited capacity.

In the preferred embodiment to be described later, the circuit is constructed such that six axes are controlled simultaneously when a point-to-point control is contemplated, whereas three axes are controlled simultaneously for a continuous path control which requires a plurality of points to be positioned. Accordingly, it is possible to decrease the capacity of the memory device which is required for the same program by increasing or decreasing as desired the axis value of each axis representing one coordinate point.

BRIEF DESCRIPTION OF THE DRAWINGS

The invention can be more fully understood from the following detailed description taken in conjunction with the accompanying drawings, in which.

DESCRIPTION OF THE PREFERRED EMBODIMENT

The construction and operation of a preferred embodiment of this invention will now be described with reference to the accompanying drawings.

Figure 1:
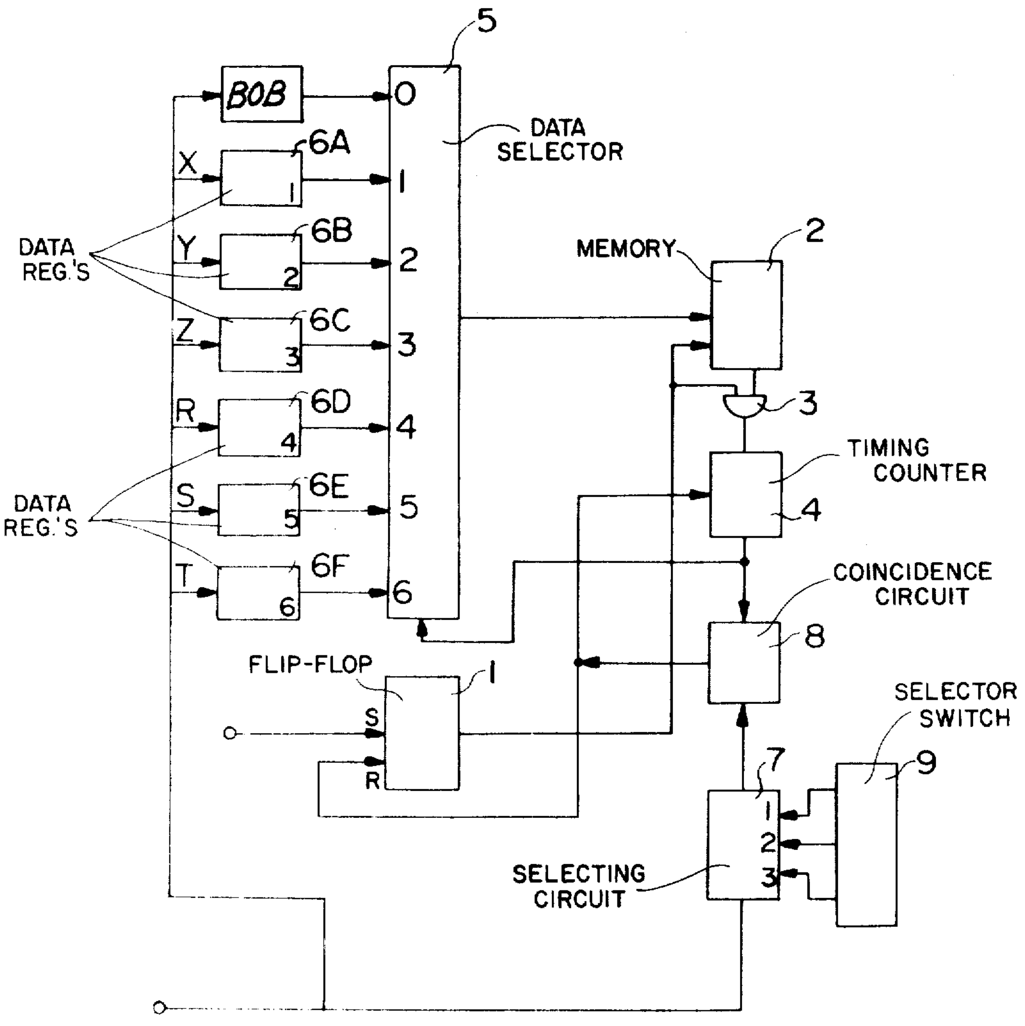
FIG. 1 is a block diagram showing the flow of signals during recording of data.

As shown in FIG. 1 during recording of the data, a sampling signal is applied to a flip-flop circuit 1 to set the same. Upon being set, the flip-flop circuit 1 supplies an output recording signal to a magnetic disc memory device 2 and an AND gate circuit 3. The AND gate circuit 3 is enabled by the recording signal and a timing signal generated by the magnetic disc memory device 2 whereby a signal is applied to a timing counter 4. When the timing counter 4 assumes a state 0 a data selector 5 selects a code corresponding to "start block" (hereinafter, designated as "BOB") and the BOB code is written in the magnetic disc memory device 2. Upon completion of the writing of the BOB code into the memory device 2 the count of the timing count 4 is increased by one counter. When one count is added to 0 in timing counter 4 data selector 5 operates to select a data register 6A associated with the X axis to write the information which has been stored in this data register 6A into the magnetic disc memory device 2.

In the same manner, each time one word (for example the information concerning one axis) is written in the magnetic disc memory device 2, the count of the timing counter 4 is successively increased and the data selector 5 successively and sequentially, selects the respective data registers 6B, 6C, . . . associated with the succeeding axes whereby the information which has been stored in these data registers is successively and sequentially written into the magnetic disc memory device 2.

Figure 3:
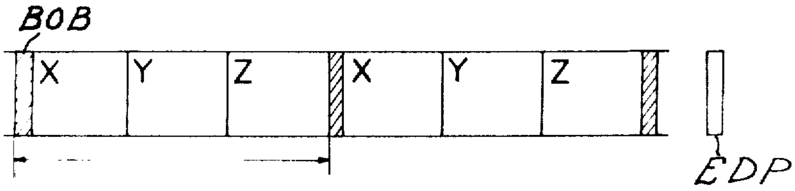
FIG. 3 is a diagram showing the construction of the word of one block of data in the case of a continuous path control.
Figure 4:
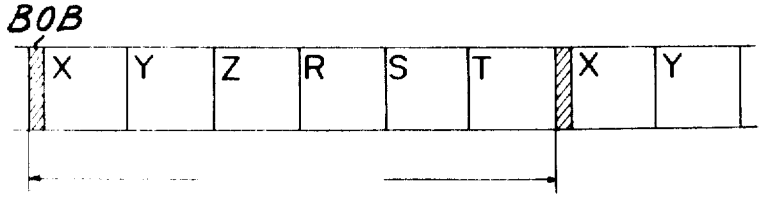
FIG. 4 is a diagram showing the construction of the word of one block of data in the case of a point-to-point control.

When a block length selecting circuit 7 in which a selection signal of one word length has been applied discriminates the last data register, that is the last information axis of the block which has been set by a selector switch 9 the selection signal is compared with the output from the timing counter 4. Upon coincidence of these two signals, a coincidence circuit 8 produces a signal which is applied to flip-flop circuit 1 for resetting the same. In this manner, recording of one block of data is completed, thereby storing a coordinate point in the magnetic disc memory device 2. Accordingly, each time a sampling signal pulse is received a series of data is read out of the data registers up to the last one designated by the selector switch 9. For example, in the case of a continuous path control where three axes X, Y and Z are simultaneously constructed, it is possible to construct the word of one block shown in FIG. 3 by setting the last data register 6C by select switch 9. On the other hand, in the case of a point-to-point control, where six axes X, Y, Z, R, S and T are simultaneously constructed it is possible to construct the word of one block shown in FIG. 4 by setting the last data register 6F by selector switch 9.

Figure 2:
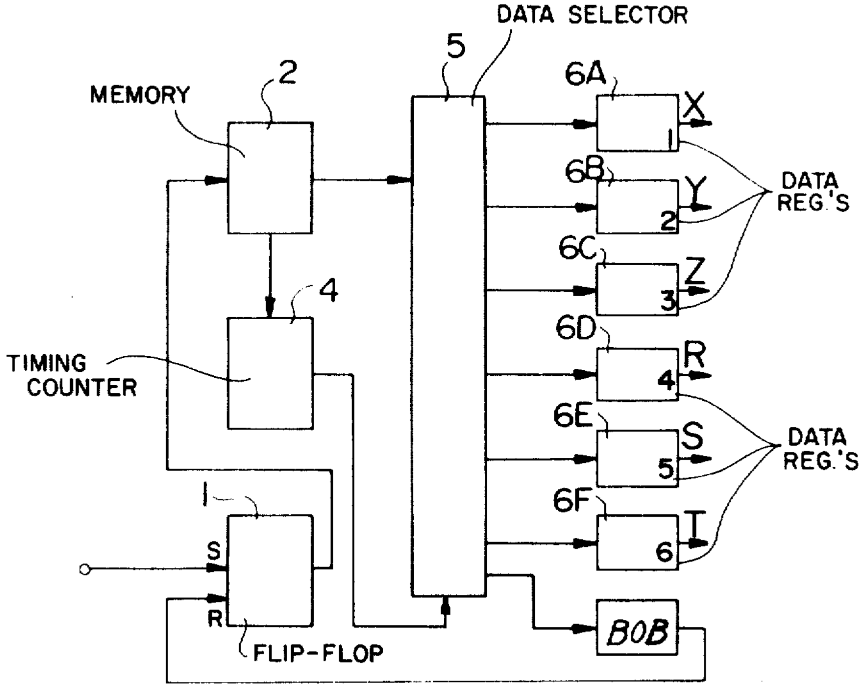
FIG. 2 is a block diagram showing the flow of signals during reproduction of data.

During reproduction, as shown in FIG. 2 upon receipt of a read pulse signal flip-flop circuit 1 is set to read out the information that has been stored in the magnetic disc memory device 2. Thus, the count of the timing counter 4 is increased by the timing signal produced by the memory device 2, and the information concerning a particular axis selected by data selector 5 is read out of the memory device 2 and the read out information is successively applied to data registers 6A, 6B – 6F. Then when the BOB code is read out from the memory device 2, flip-flop circuit 1 is reset, thereby reading out one coordinate point.

In this manner, each time a read pulse is received at the input of flip-flop 1, the information of one block is read out or reproduced.

As above described, in accordance with this invention, where a plurality of coordinate points are necessary for one program or where the storing capacity of the memory device is limited, the construction of the word for one block is varied for respective cases, thereby efficiently utilizing the memory device.

The term "magnetic memory device" utilized herein is intended to cover any memory device having a constant read out speed, for example a magnetic disc or magnetic drum.

What is claimed is:

1. Apparatus for controlling the positioning of a moving machine including a plurality of drive axes, by providing variable length positioning information data blocks, said apparatus comprising:

a flip-flop circuit (1) coupled to be set by a sampling input signal for producing a recording signal;

a memory device (2) responsive to said recording signal for generating a timing signal;

a timing counter (4) coupled to said memory device (2) and to said flip-flop circuit (1) and operative in response to the presence of said recording signal and said timing signal;

a plurality of data registers (6A-6F) for storing positioning data words of said machine, said data words collectively defining a block of data;

a data selector (5) coupled to said timing counter (4), to said memory device (2) and to said data registers (6A-6F) for selecting a block commencement code (BOB) and writing said code into said memory device (2) when the count of said timing counter (4) assumes a predetermined value;

said timing counter (4) successively selecting one of said data registers (6A–6F) via said data selector (5) to write the data stored in said selected data register into said memory device (2) each time said timing counter (4) increases its count;

a block length selecting circuit (7) for selecting the total number of said data words which are to comprise a given block of data, said block length selecting circuit (7) selecting one of said data registers which has stored therein the information word corresponding to the last position information data which comprises said given block of data, said given block of data thereby comprising the data words stored in said data registers successively selected by said data selector (5) up to and including the data register selected by said block length selecting circuit (7); and a coincidence circuit (8) for comparing the output of said block length selecting circuit (7) with the count of said counter (4) and for resetting said flip-flop circuit (1) and said timing counter (4) upon detection of coincidence between the outputs of said timing counter (4) and said block length selecting circuit (7);

whereby only the information which has been stored in said successively selected data registers up to and including the data register selected by said block length selecting circuit (7), which information corresponds to said given block of data, is selectively stored in said memory device (2).

2. Apparatus according to claim 1 including a gate circuit (3) interposed between said timing counter and said memory device (2) and flip-flop circuit (1).

3. Apparatus according to claim 2 wherein said gate circuit (3) is an AND gate for anding the timing signal output of said memory device (2) and said recording signal.

4. Apparatus according to claim 1 wherein said block length selecting circuit (7) includes a selector switch (9) for selecting a given data register.

5. Apparatus according to claim 1 wherein said memory device (2) generates a timing signal each time a block commencement code (BOB) or a data word from one of said data registers (6A–6F) is stored therein.

6. Apparatus according to claim 5 wherein said timing counter (4) increments its count responsive to each timing signal.

7. Apparatus according to claim 1 wherein said block length selecting circuit (7) generates an output number corresponding to a selected data register, and said coincidence circuit (8) detects coincidence between said output number and the count of said timing counter (4).

8. Apparatus for use in contrilling the positioning of a moving machine including a plurality of drive axes, by providing variable length positioning information data blocks, said apparatus comprising:

a flip-flop circuit (1) coupled to be set by a read input signal for producing a read-out signal;

a memory device (2) responsive to said read-out signal from said flip-flop circuit (1) for generating a timing signal;

a timing counter (4) coupled to said memory device (2) and being operative in responsive to said timing signal:

a plurality of data registers (6A-6F) for storing positioning data words of said machine, said data words collectively defining a block of data;

said memory storing a predetermined number of said positioning data words followed by a predetermined code (BOB), said stored data words comprising a given block of data;

a data selector (5) coupled to said timing counter (4), to said memory device (2) and to said data registers (6A-6F) for controlling the writing of data words read out of said memory device (2) into said data registers when the count of said timing counter (4) assumes a predetermined value;

said timing counter (4) successively selecting one of said data registers (6A-6F) via said data selector (5) to write the respective data words from said memory device (2) in a different selected data register each time said timing counter (4) increases its count; and means responsive to the reading out of said predetermined code (BOB) from said memory device (2) for resetting said flip-flop circuit (1) to terminate the read out of data from said memory device (2).

9. Apparatus according to claim 8 wherein said memory device (2) generates a timing signal each time data is read out of said memory device (2) and stored in one of said data registers (6A–6F).

10. Apparatus according to claim 8 wherein said timing counter (4) increments its count responsive to each timing signal.

* * * * *